(12) United States Patent
Norris et al.

(10) Patent No.: US 8,825,294 B2
(45) Date of Patent: Sep. 2, 2014

(54) VEHICLE CENTER OF GRAVITY ACTIVE SUSPENSION CONTROL SYSTEM

(75) Inventors: William R. Norris, Rock Hill, SC (US); Bernard E. Romig, Illinois City, IL (US)

(73) Assignee: Deere & Company, Moline, IL (US)

(*) Notice: Subject to any disclaimer, the term of this patent is extended or adjusted under 35 U.S.C. 154(b) by 188 days.

(21) Appl. No.: 13/192,900

(22) Filed: Jul. 28, 2011

(65) Prior Publication Data

US 2013/0030650 A1 Jan. 31, 2013

(51) Int. Cl.
*B60G 17/018* (2006.01)
*G06F 7/00* (2006.01)
*G06F 17/00* (2006.01)

(52) U.S. Cl.
USPC .................................. 701/40; 701/36; 701/37

(58) Field of Classification Search
CPC .................................................... B60G 17/018
USPC .......................................................... 701/40
See application file for complete search history.

(56) References Cited

U.S. PATENT DOCUMENTS

| | | | | |
|---|---|---|---|---|
| 4,903,983 | A * | 2/1990 | Fukushima et al. | 280/5.503 |
| 5,136,513 | A * | 8/1992 | Sol et al. | 701/124 |
| 6,424,907 | B1 | 7/2002 | Rieth et al. | |
| 6,463,371 | B1 * | 10/2002 | Ulyanov et al. | 701/40 |
| 6,701,236 | B2 * | 3/2004 | Ulyanov et al. | 701/40 |
| 7,694,946 | B2 | 4/2010 | Shoemaker et al. | |
| 7,887,033 | B2 | 2/2011 | Shoemaker et al. | |
| 8,655,577 | B2 * | 2/2014 | Stender | 701/124 |
| 2002/0180166 | A1 * | 12/2002 | Voss | 280/5.5 |
| 2005/0119986 | A1 * | 6/2005 | Panfilov et al. | 706/59 |
| 2006/0076741 | A1 | 4/2006 | Lim | |
| 2006/0253240 | A1 * | 11/2006 | Rao et al. | 701/48 |
| 2006/0265108 | A1 | 11/2006 | Kieren et al. | |
| 2006/0293817 | A1 * | 12/2006 | Hagiwara et al. | 701/40 |
| 2008/0195281 | A1 * | 8/2008 | Norris et al. | 701/44 |
| 2008/0195282 | A1 * | 8/2008 | Norris et al. | 701/44 |
| 2008/0195293 | A1 * | 8/2008 | Norris et al. | 701/98 |

(Continued)

FOREIGN PATENT DOCUMENTS

DE 10306448 A1 8/2004
FR 839855 A 4/1939

OTHER PUBLICATIONS

D'Amato et al, Fuzzy control for active suspensions, 1998, School of Aeronautics and Astronautics, Purdue University.*

(Continued)

*Primary Examiner* — Calvin Cheung
*Assistant Examiner* — Krishnan Ramesh
(74) *Attorney, Agent, or Firm* — Yee & Associates, P.C.

(57) ABSTRACT

A method of controlling a vehicle suspension system including the steps of detecting, computing and altering the center of gravity of the vehicle. The detecting step includes the detecting of a center of gravity of the vehicle thereby defining a detected center of gravity. The computing step includes computing what alteration of a plurality of actuators is needed to substantially reduce a value of a difference between the detected center of gravity and a preferred center of gravity using a fuzzy relations control strategy. The computing step is carried out in a controller. The altering step includes altering the center of gravity of the vehicle by way of the controller actuating at least one of the actuators connected to suspension elements of the vehicle dependent upon the alteration arrived at in the computing step.

20 Claims, 2 Drawing Sheets

(56) References Cited

U.S. PATENT DOCUMENTS

| | | | |
|---|---|---|---|
| 2008/0223630 A1* | 9/2008 | Couture et al. | 180/9.32 |
| 2009/0138157 A1* | 5/2009 | Hagglund et al. | 701/38 |
| 2009/0254251 A1* | 10/2009 | Sato | 701/41 |
| 2010/0071984 A1* | 3/2010 | Doi et al. | 180/218 |
| 2011/0046848 A1* | 2/2011 | Stender | 701/38 |
| 2011/0137462 A1* | 6/2011 | Nakamura et al. | 700/253 |
| 2011/0301785 A1* | 12/2011 | Sword | 701/2 |
| 2012/0095647 A1* | 4/2012 | Braunberger et al. | 701/38 |
| 2012/0123647 A1* | 5/2012 | Doi et al. | 701/49 |
| 2012/0158247 A1* | 6/2012 | Norris et al. | 701/44 |
| 2012/0265401 A1* | 10/2012 | Stuetzler et al. | 701/38 |

OTHER PUBLICATIONS

Son et al., Fuzzy control of an automotive active suspension, Jun. 1996, Department of Electrical and Computer Engineering, Syracuse University.*

Ting et al., Design of fuzzy controller for active suspension system, 1994, National Cheng Kung University, Taiwan.*

European Search Report, dated Nov. 23, 2012 (5 pages).

* cited by examiner

VEHICLE CENTER OF GRAVITY ACTIVE SUSPENSION CONTROL SYSTEM

FIELD OF THE INVENTION

The present invention relates to an active suspension system, and, more particularly, to an active suspension system that optimizes the location of the center of gravity of a vehicle.

BACKGROUND OF THE INVENTION

Active center of gravity management techniques involve the tilting of the vehicle chassis relative to the surface on which it rests in order to position the center of gravity with respect to the support points on the terrain. The prior art focus has been on the effect that regular and irregular surfaces of the ground have on the vehicle as well as the positioning of the vehicle system alignment relative to the ground and to reduced abrupt changes in the position of the vehicle relative to passengers. Some prior art systems include control systems that measure movement and timing of the suspension devices and after contact with an irregular surface the system calculates the reaction to take.

The term "center of gravity" (CG) is often interchangeably used with the term "center of mass." Although they can be different concepts, they do coincide when the object under consideration is in a uniform gravitational field. The center of mass of a system of particles is defined as the average of their physically weighted masses. For a continuous distribution of mass the CG is the same as the centroid of the shape.

The concept of center of mass or CG was first introduced by the ancient Greek physicist, mathematician and engineer Archimedes of Syracuse. Archimedes showed that the torque exerted on the lever by weights resting at various points along the lever is the same as what it would be if all the weights were moved to a single point, or their center of mass. Working with floating bodies Archimedes demonstrated that the orientation of a floating object is the one that makes its center of mass as low as possible. He even developed mathematical techniques for finding the center of gravity of objects of uniform density of various well-defined shapes such as the triangle, hemisphere and a frustum.

What is needed in the art is an active suspension that changes the center of gravity in an efficient economical manner.

SUMMARY

The invention in one form is directed to a method of controlling a vehicle suspension system including the steps of detecting, computing and altering the location of the center of gravity of the vehicle with respect to the support points on the terrain. The detecting step includes the detecting of a center of gravity of the vehicle thereby defining a detected center of gravity. The computing step includes computing what alteration of a plurality of actuators is needed to substantially reduce a value of a difference between the detected center of gravity and a preferred center of gravity using a fuzzy relations control strategy. The computing step is carried out in a controller. The altering step includes altering the center of gravity of the vehicle by way of the controller actuating at least one of the actuators connected to suspension elements of the vehicle dependent upon the alteration arrived at in the computing step.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one embodiment of the invention and such exemplifications are not to be construed as limiting the scope of the invention in any manner.

DETAILED DESCRIPTION

Figure 1:
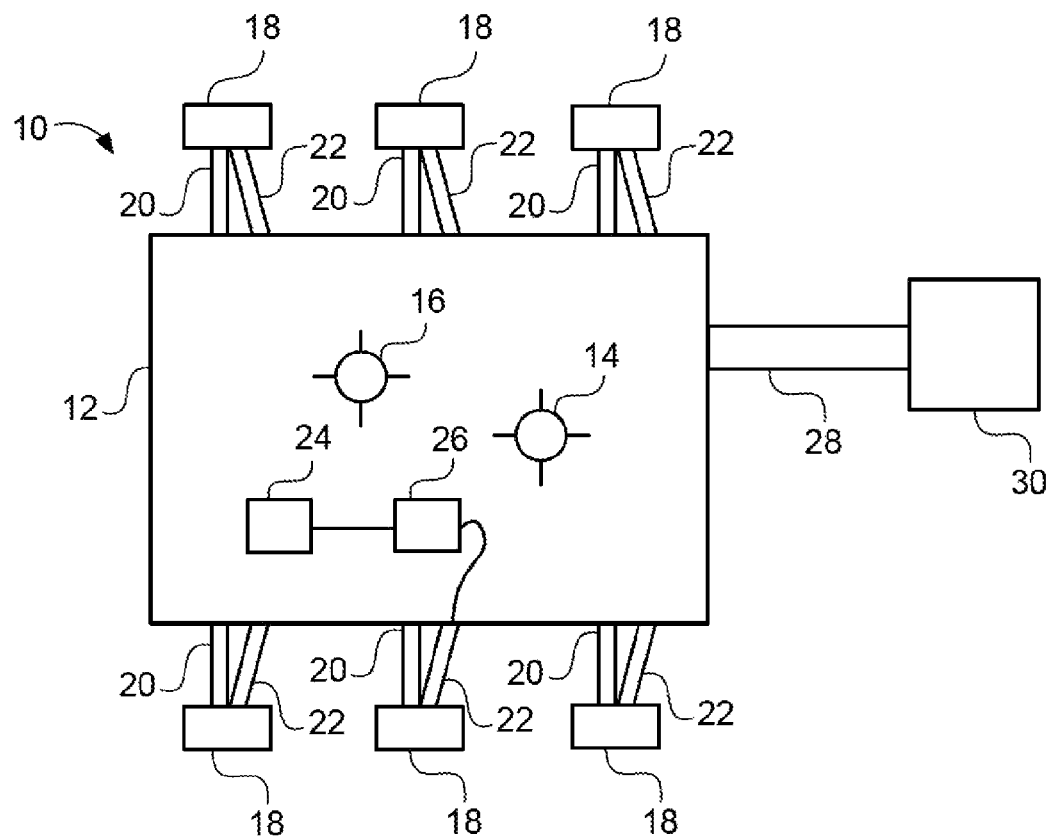
FIG. 1 is a schematical top view of a vehicle utilizing an embodiment of a center of gravity altering suspension system of the present invention.
Figure 2:
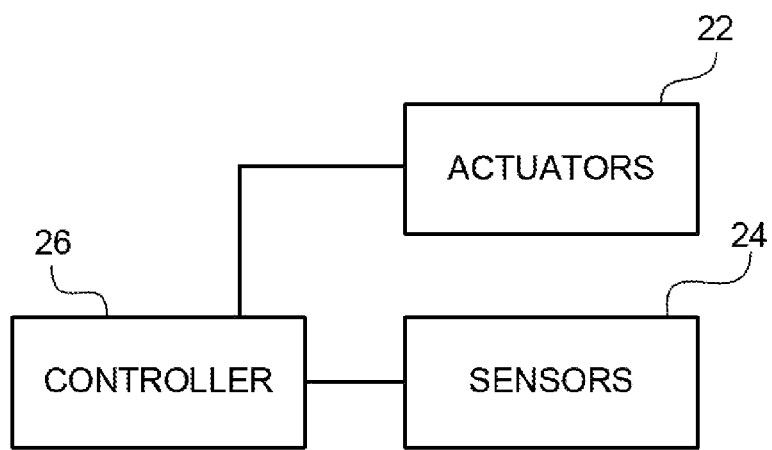
FIG. 2 is a block diagram of a control system utilized by the center of gravity altering suspension system of FIG. 1.

Referring now to the drawings, and more particularly to FIGS. 1 and 2, there is illustrated a vehicle 10 having a chassis 12 with a center of gravity 14 and a desired center of gravity 16. Chassis 12 has ground engaging traction devices 18, suspension elements 20 and actuators 22. Sensors 24 are fixed about chassis 12 as well as on suspension elements 20 to determine the position, attitude and orientation of vehicle 10. Controller 26 is connected to sensors 24 as well as actuators 22 and based upon the input received from sensors 24, controller 26 processes the information and actuates actuators 22 to thereby carry out the method of the present invention.

An actuating element 28 may be connected to chassis 12 with an acquired load 30 being coupled thereto. This may be in the form of articulated arm or other device that is configured to engage load 30 and move load 30 relative to chassis 12 and/or the ground. For example, actuating element: 28 may be the arm of a backhoe or a forestry vehicle. Although FIG. 1 illustrates a top view of vehicle 10, it is also to be understood that center of gravity 14 and 16 is a three-dimensional calculated position relative to the support points of vehicle 10 on the terrain. The desired center of gravity 16 is illustrated as being in a different position than center of gravity 14 to illustrate the method carried out in controller 26. The desired center of gravity 16 may be a predetermined center of gravity, or it may be a dynamically determined desired center of gravity 16. For example, as load 30 is acquired the desired center of gravity 16 may shift away from load 30 to compensate for an additional potential load. In reaction to changes in the orientation of vehicle 10 and loads applied thereto, center of gravity 14 is calculated and the method of the present invention is carried out on controller 26 by the actuation of actuators 22 which affect suspension 20 so as to alter the calculated center of gravity 14 such that it substantially corresponds with the desired center of gravity 16.

Figure 3:
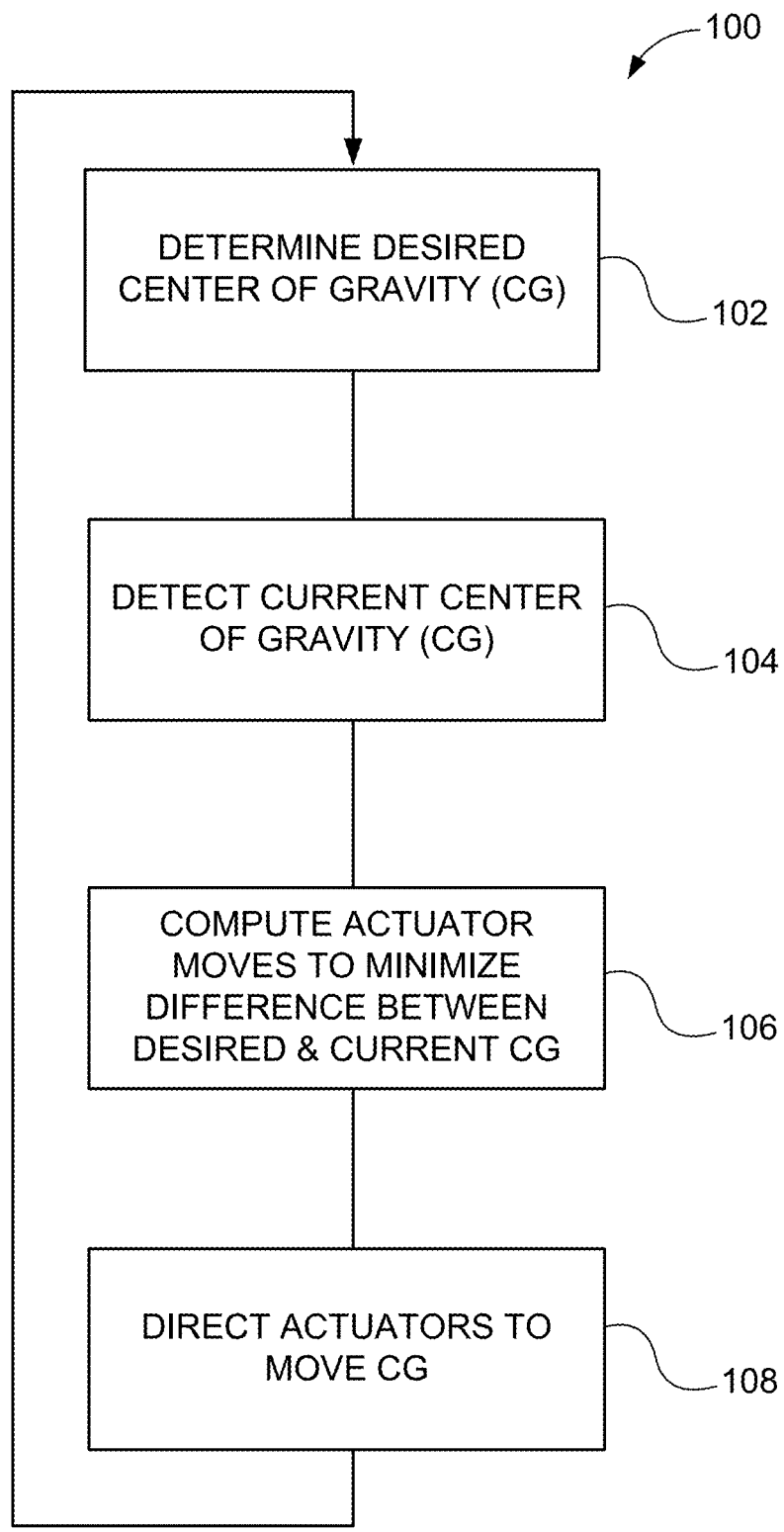
FIG. 3 is a flowchart of a method utilized by the control system of FIGS. 1 and 2.

Now, additionally referring to FIG. 3, there is illustrated an embodiment of the present invention in the form of a method 100, which includes steps 102 through 108. At step 102 method 100 determines the desired center of gravity 16, which may be predetermined or a dynamically determine position. At step 104, method 100 detects the current center of gravity of vehicle 10. Again this is a three-dimensional determination and the results are compared to the desired center of gravity 16 in the actions to be undertaken in step 106. In step 106, controller 26 computes what the needed movements of actuators 22 are in order to minimize the difference between desired center of gravity 16 and the calculated center of gravity 14. At step 108, method 100 directs actuators 22 to activate and interact with elements of suspension 20 in order to shift the center of gravity 14 toward the desired serum gravity 16.

Method 100 illustrates an advanced suspension system with an active CG management component. Active CG management involves tilting the chassis relative to the surface on which it is rested to optimally position the CG with respect to the support points, which in this case are ground engaging traction devices 18, which may be in the form of wheels, on the terrain. In simple cases, with a properly balanced vehicle, this is essentially a self-leveling scheme. In more complex cases, the vehicle is able to use its own weight to counterbalance the terrain changes and to offset loads that may be placed upon chassis 12.

The suspension 20 is either semi-active or fully active with passive elements to support the base load. The linkages of suspension 20 and actuators 22 have sufficient travel to permit moderate degrees of CG management while still isolating vehicle 10 from terrain roughness. The present invention may shift between fully active suspension and semi-active suspension based on a trade-off between performance and energy requirements. A regenerative fully active system is contemplated with the regeneration occurring so that energy can be recaptured. Energy may be drawn from the power system, omitted for the sake of clarity, of vehicle 10 to provide power and to enhance mobility of vehicle 10. Vehicle 10 maybe in an unmanned guided vehicle (UGV) that actively controls the center of gravity.

Active center of gravity management entails lateral and longitudinal leveling of chassis 12 by retracting high side suspension units 20 while simultaneously extending low side suspension units 20. Controller 26 interacts with the plurality of ground engaging traction devices 18 so as to conform with terrain curvature in both directions while simultaneously equalizing wheel loads to the extent allowed by the actual loading of vehicle 10. Since total suspension travel is finite, the maximum leveling results in a relatively rigid suspension while operating on level train allows all of the suspension travel to be used to isolate the movements of chassis 12 and the payload thereon from terrain-induced vibration.

When in fully active mode the suspension is most efficient when the dead load is supported by passive devices. The passive devices of the present invention allow for both static position adjustment and continuously variable spring rate. The advantages of these features are provided by the positioning of actuators 22 and may include passive damping in a semi-active system using a minimum frequency response to allow for active CG management and a fully active version. The frequency response of the fully active suspension is adequate for center of gravity management and allows the static suspension adjustments to be made with a low-frequency system thereby reduce total energy requirements.

In contrast to prior art systems, the present invention, particularly for an unmanned vehicle, allows for the removal of human operator considerations with a corresponding loosening of limitations in the control the center of gravity. The use of semi-autonomous and autonomous vehicles allow many of the vehicle states to be measured and implemented, to also be used to perform vehicle guidance control as well. Exploiting the autonomous nature of the present invention and the subsequent knowledge of the vehicle states, the operational envelope of the vehicle's capability are enhanced by using the nonlinear suspension controller of the present invention. Controller 26 has access to a memory device that contains constraints that are based on the material stress limits of vehicle 10 and the electronics reliability factors such as those that are related to vibration.

The inputs to controller 26 include feedback from sensors 24 which include load sensors on each axle, wheel slip sensors, a vehicle speed sensor, a roll sensor, a pitch sensor and a yaw sensor. The sensors provide angle, angular rates and acceleration information to controller 26, with the information coming from an onboard inertial measurement unit (IMU). Additional inputs include vehicle vibration amplitude and frequency that is reported to controller 26 by way of sensors 24. Based on the input information received by controller 26 an optimal CG location 16 is determined at step 102, with kinematic and dynamic constraints, and the errors between the current center of gravity 14 and the desired center of gravity 16 provide inputs to the nonlinear suspension control system of the present invention.

Further, positional detecting lasers such as scanning 3D SICK lasers, provide terrain mapping and perform predictive control of the center of gravity position. This allows for predictive control of the center of gravity based upon anticipated changes in the terrain.

The nonlinear suspension system used by controller 26 may be in the form of an optimal Mamdani type fuzzy system with some modifications to the rule base and the defuzzification method. The present invention controls the fluid flow to actuators 22 and act as a rate controller to remove saturation nonlinearity. As a rate controller, method 100 does not require rate of error changes as inputs. As there is no previous memory required by the present invention each controlled actuation will be a discrete event based upon the current state of the vehicle, thereby precluding a prior state input.

Due to the large number of inputs to controller 26 and the need for a solution with a high degree of fidelity, an approach known as a fuzzy relations control strategy (FRCS) is employed to reduce the size of the rule base, while maintaining fidelity when beneficial. The FRCS method is a hierarchical method employed by the multi-objective nonlinear controller method implemented in controller 26. Method 100 applies the control strategy in the following way: The linguistic variables for each membership function are termed the fuzzy relations control variables (FRCV). A multistage control strategy is defined using the fuzzy membership functions and their linguistic variables and is based on reducing the system error state or states to zero or as close to zero as possible. The related fuzzy relations control variables are used as classifiers within the rule-based structure, defining the relative importance of the other membership functions and maintaining the control strategy. Each fuzzy relations control variable has a corresponding degree of importance assigned thereto, based on the error state.

An issue avoided by the present invention is one that is reoccurring in prior art systems, relative to fuzzy controllers known as a "bang-bang" control effect. The definition of an acceptable region linguistic variables in all of the membership functions alleviates the bang-bang control effects as there is a specified state region on the system manifold where the vehicle state is acceptable (having reasonable error), with a corresponding crisp output of zero from controller 26. Advantageously system response granularity is also reduced.

Whereas the system operates in real-time a center of maximum defuzzification method is utilized to provide crisp values to the valves associated with actuators 22, to control the fluid flow to the suspension actuators 22. Advantageously, the manipulating of the center of gravity placement allows for an operational envelope of the vehicle to be enhanced as well as extending the ability of the vehicle to operate in the most complex terrain. Movement of actuators 22 can also be utilized to regenerate energy for storage in either pressurized hydraulic system or the charging of batteries.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A center of gravity control system for a vehicle, comprising:
   a plurality of ground engaging traction devices connected to the vehicle by suspension elements;
   a plurality of actuators connected to the suspension elements, the plurality of actuators configured to be activated to shift a center of gravity of the vehicle;
   a plurality of sensors positioned about the vehicle; and
   a controller connected to each of said plurality of actuators,
   said controller configured to receive information from said plurality of sensors, said information relating to at least one of mass distributions of the vehicle and mass distributions of loads carried by the vehicle thereby defining distributed masses, and
   said controller configured to compute a detected center of gravity of the vehicle based on the information and
   to compute at least one alteration of said actuators needed to reduce a value of a difference between said detected center of gravity of the vehicle and a desired center of gravity using a fuzzy relations control strategy,
   wherein based on the computed alteration said controller is configured to activate at least one of said plurality of actuators connected to the suspension elements of the vehicle to shift the center of gravity of the vehicle.

2. The center of gravity control system of claim 1, wherein certain ones of the plurality of sensors are positioned about a chassis of the vehicle and other ones of the plurality of sensors are positioned on the suspension elements of the vehicle.

3. The center of gravity control system of claim 2, wherein said controller is a multi-objective nonlinear controller that is configured to control fluid flow to the plurality of actuators.

4. The center of gravity control system of claim 1, wherein said computed alteration is computed in three dimensions.

5. The center of gravity control system of claim 1, wherein said fuzzy relations control strategy includes using fuzzy membership functions and linguistic variables without using rate of error changes as input to the fuzzy relations control strategy.

6. The center of gravity control system of claim 5, wherein the linguistic variables are used as classifiers within a rule based structure to define a relative importance of the fuzzy membership functions, and wherein the linguistic variables each have a corresponding degree of importance assigned thereto.

7. The center of gravity control system of claim 1, further comprising:
   a load activating element connected between the vehicle and an acquired load external to the vehicle, wherein the desired center of gravity is dynamically determined based on the acquired load.

8. The center of gravity control system of claim 7, wherein the vehicle is one of an agricultural vehicle, a construction vehicle, and a forestry vehicle.

9. The center of gravity control system of claim 1, further comprising:
   at least one three-dimensional laser that is used to predict the desired center of gravity based upon anticipated changes in terrain upon which the vehicle is travelling.

10. The center of gravity control system of claim 9, wherein said fuzzy relations control strategy includes said activation of said actuators dependent on a current state of the vehicle without any prior state input being provided to the fuzzy relations control strategy.

11. A method of controlling a center of gravity of a vehicle, the method comprising:
    detecting the center of gravity of the vehicle thereby defining a detected center of gravity;
    computing at least one alteration of a plurality of actuators needed to reduce a value of a difference between said detected center of gravity and a preferred center of gravity using a fuzzy relations control strategy,
    said computing step being carried out in a controller and said plurality of actuators configured to be activated to shift the center of gravity of the vehicle; and
    altering the center of gravity of the vehicle by way of said controller actuating at least one of said actuators connected to suspension elements of the vehicle dependent upon said alteration arrived at in said computing step.

12. The method of claim 11, wherein some of the plurality of sensors are positioned about a chassis of the vehicle and other of the plurality of sensors are positioned on the suspension elements of the vehicle.

13. The method of claim 12, wherein said controller is a multi-objective nonlinear controller that is configured to control fluid flow to the plurality of actuators.

14. The method of claim 11, wherein said computed alteration is computed in three dimensions.

15. The method of claim 11, wherein said fuzzy relations control strategy includes using fuzzy membership functions and linguistic variables without using rate of error changes as input to the fuzzy relations control strategy.

16. The method of claim 15, wherein the linguistic variables are used as classifiers within a rule based structure to define a relative importance of the fuzzy membership functions, and wherein the linguistic variables each have a corresponding degree of importance assigned thereto.

17. The method of claim 11, further comprising:
    dynamically determining the desired center of gravity based on an acquired load external to the vehicle.

18. The method of claim 17, wherein the vehicle is one of an agricultural vehicle, a construction vehicle, and a forestry vehicle.

19. The method of claim 11, further comprising:
    predicting the desired center of gravity based upon anticipated changes in terrain upon which the vehicle is travelling.

20. The method of claim 19, wherein said fuzzy relations control strategy includes said actuating of said actuators dependent on a current state of the vehicle without any prior state input being provided to the fuzzy relations control strategy.

* * * * *